United States Patent
Luce et al.

(10) Patent No.: US 11,130,564 B2
(45) Date of Patent: Sep. 28, 2021

(54) STRUT SHRINK USING ACCUMULATOR AS ENERGY SOURCE

(71) Applicant: GOODRICH CORPORATION, Charlotte, NC (US)

(72) Inventors: William E Luce, Colleyville, TX (US); Adam J. Ditzler, Fort Worth, TX (US)

(73) Assignee: Goodrich Corporation, Charlotte, NC (US)

( * ) Notice: Subject to any disclaimer, the term of this patent is extended or adjusted under 35 U.S.C. 154(b) by 926 days.

(21) Appl. No.: 15/851,169

(22) Filed: Dec. 21, 2017

(65) Prior Publication Data

US 2019/0193846 A1    Jun. 27, 2019

(51) Int. Cl.
| | |
|---|---|
| *B64C 25/60* | (2006.01) |
| *B64C 25/22* | (2006.01) |
| *B64C 25/28* | (2006.01) |
| B64C 25/00 | (2006.01) |
| F16F 9/56 | (2006.01) |

(52) U.S. Cl.
CPC .............. *B64C 25/60* (2013.01); *B64C 25/22* (2013.01); *B64C 25/28* (2013.01); *B64C 2025/008* (2013.01); *F16F 9/56* (2013.01)

(58) Field of Classification Search
CPC ......... B64C 25/60; B64C 25/22; B64C 25/28; B64C 2025/008; F16F 9/56
See application file for complete search history.

(56) References Cited

U.S. PATENT DOCUMENTS

| | | |
|---|---|---|
| 5,219,152 A | 6/1993 | Derrien et al. |
| 5,908,174 A | 6/1999 | Churchill et al. |
| 8,886,402 B1 | 11/2014 | Lou |
| 9,481,453 B2 | 11/2016 | Luce |
| 9,771,147 B2 | 9/2017 | Luce |
| 10,486,802 B2* | 11/2019 | Luce ................ B64C 25/18 |
| 2014/0137680 A1 | 5/2014 | Leglize |

(Continued)

FOREIGN PATENT DOCUMENTS

| | | |
|---|---|---|
| DE | 102004016341 | 12/2005 |
| EP | 3357814 | 8/2018 |

(Continued)

OTHER PUBLICATIONS

European Patent Office, European Search Report dated Mar. 4, 2019 in Application No. 18214202.6.

(Continued)

*Primary Examiner* — Brian M O'Hara
*Assistant Examiner* — Keith L Dixon
(74) *Attorney, Agent, or Firm* — Snell & Wilmer L.L.P.

(57) ABSTRACT

Systems and methods for enabling aircraft shock strut shrink are provided. The system may comprise a shock strut comprising a shrink piston, an accumulator comprising a gas piston and a hydraulic chamber, wherein the gas piston is configured to apply gas pressure to the hydraulic chamber, and a first valve in fluid communication with the accumulator. The system may further comprise a second valve, wherein the second valve is in fluid communication with a vent, the pneumatic cylinder, and the gas piston, wherein the first valve is in fluid communication with the hydraulic chamber and the shrink piston.

13 Claims, 7 Drawing Sheets

(56) References Cited

U.S. PATENT DOCUMENTS

2014/0346273 A1* 11/2014 Nelson .................... B64C 25/34
                                                      244/102 A
2015/0102163 A1*  4/2015 Luce ....................... B64C 25/22
                                                     244/102 SS

FOREIGN PATENT DOCUMENTS

GB          576115      3/1946
GB          2057629     4/1981

OTHER PUBLICATIONS

European Patent Office, European Office Action dated Oct. 28, 2020 in Application No. 18214202.6.

* cited by examiner

STRUT SHRINK USING ACCUMULATOR AS ENERGY SOURCE

FIELD

The present disclosure relates to aircraft retractable landing gear systems, and, more specifically, to systems and methods for shrinking a landing gear shock strut.

BACKGROUND

Landing gear supports an aircraft while the aircraft is on the ground. Landing gear may include one or more wheels and a shock strut assembly in order to attenuate the forces associated with landing or ground operations. A shock strut assembly may have a length greater than the wheel well of the aircraft and may shrink lengthwise in order to fit within the wheel well when retracted. A landing gear shock strut assembly may need to shrink to fit in a wheel well. To shrink a strut assembly, power may be provided by an aircraft utility hydraulic system. However, tapping power from the utility hydraulic system increases the utility hydraulic system load and decreases utility hydraulic system performance. An independent system is therefore desirable.

SUMMARY

In various embodiments, a system for enabling shock strut shrink is provided. The system may comprise a shock strut comprising a shrink piston, an accumulator comprising a pneumatic cylinder, a gas piston, and a hydraulic chamber, wherein the gas piston is configured to apply gas pressure to the hydraulic chamber, and a first valve in fluid communication with the accumulator.

In various embodiments, the system may further comprise a second valve, wherein the second valve is in fluid communication with a vent, the pneumatic cylinder, and the gas piston, wherein the first valve is in fluid communication with the hydraulic chamber and the shrink piston. In various embodiments, the system may further comprise a gas supply in fluid communication with the second valve. In various embodiments, the system may further comprise a pneumatic pump in fluid communication with the second valve and a first sensor in electronic communication with a controller, the first sensor configured to measure at least one of a first landing gear parameter, a second landing gear parameter, a third landing gear parameter, or a shock strut parameter and a tangible, non-transitory memory configured to communicate with the controller, the tangible, non-transitory memory having instructions stored thereon that, in response to execution by the controller, cause the controller to perform operations comprising: receiving, by the controller, a first command signal and the first landing gear parameter, and controlling, by the controller, the pneumatic pump and the first valve in response to the first command signal and the first landing gear parameter. In various embodiments, the operations further comprise receiving, by the controller, the shock strut parameter and controlling, by the controller, the first valve in response to the shock strut parameter, and receiving, by the controller, the second landing gear parameter and controlling, by the controller, the pneumatic pump in response to the second landing gear parameter. In various embodiments, the operations further comprise receiving, by the controller, a second command signal and a third landing gear parameter and controlling, by the controller, the second valve, in response to at least one of the second command signal or the third landing gear parameter. In various embodiments, the operations further comprise controlling, by the controller, the first valve and the second valve in response to the third landing gear parameter and the first landing gear parameter. In various embodiments, the system further comprises a second sensor configured to measure a pressure parameter of the accumulator. In various embodiments, the operations further comprise receiving, by the controller, the pressure parameter of the accumulator and calculating, by the controller, a difference between the pressure parameter and a threshold pressure. In various embodiments, the operations further comprise controlling, by the controller, the pneumatic pump and at least one of the first valve or the second valve in response to the difference between the pressure parameter and the threshold pressure. In various embodiments, the threshold pressure is an operating pressure of the pneumatic cylinder. In various embodiments, the first landing gear parameter comprises a weight-on-wheels condition, wherein the second landing gear parameter comprises an up and locked condition of the landing gear, wherein the third landing gear parameter comprises a down and locked condition of the landing gear, wherein the shock strut transitions from an unshrunk state to a shrunk state in response to the controlling, by the controller, of the first valve, and wherein the shock strut transitions from the shrunk state to the unshrunk state in response to the controlling, by the controller, of the first valve and the second valve.

In various embodiments, a method for shrinking a shock strut is provided. The method may comprise: pressurizing an accumulator comprising a pneumatic cylinder, a gas piston, and a hydraulic chamber in fluid communication with a shock strut, transitioning the shock strut from an unshrunk state to a shrunk state in response to the pressurizing the accumulator, depressurizing the accumulator, and transitioning the shock strut from the shrunk state to the unshrunk state in response to the depressurizing the accumulator.

In various embodiments, the method further comprises actuating a valve in fluid communication with the accumulator and a gas supply and receiving, by the accumulator, a gas under pressure from the gas supply into the pneumatic cylinder. In various embodiments, the method further comprises sending, by the accumulator, a hydraulic fluid under pressure from the gas piston to a shrink port of the shock strut. In various embodiments, the method further comprises actuating the valve and sending, by the accumulator, the gas under pressure to a vent and, receiving, by the accumulator, the hydraulic fluid under pressure from shrink port into the hydraulic chamber.

In various embodiments an article of manufacture is provided. The article of manufacture may include a tangible, non-transitory computer-readable storage medium having instructions stored thereon that, in response to execution by a processor, cause the processor to perform operations comprising: receiving, by the processor, a first command signal and receiving, by the processor, a first landing gear parameter from a sensor in electronic communication with the controller wherein the first landing gear parameter comprises measured characteristics of a landing gear comprising a shock strut comprising a shrink piston, controlling, by the processor, a pneumatic pump in fluid communication with an accumulator comprising a pneumatic cylinder, a gas piston, and a hydraulic chamber, in response to the first command signal and the first landing gear parameter, and controlling, by the processor, a first valve in fluid communication with the hydraulic chamber and a shrink port of the shrink piston, wherein the gas piston is configured to apply gas pressure to the hydraulic chamber.

In various embodiments, the article of manufacture may further comprise the operation of receiving, by the processor, a shock strut parameter of the shock strut and controlling, by the processor, the first valve in response to the shock strut parameter, and receiving, by the processor, a second landing gear parameter of the landing gear and controlling, by the processor, the pneumatic pump in response to the second landing gear parameter. In various embodiments, the article of manufacture may further comprise the operation of receiving, by the processor, a second command signal and a third landing gear parameter of the landing gear and controlling, by the processor, a second valve in fluid communication with a vent and the pneumatic cylinder in response to at least one of the second command signal or the third landing gear parameter, and controlling, by the processor, the first valve and the second valve in response to the third landing gear parameter and the first landing gear parameter. In various embodiments, the article of manufacture may further comprise the operation of receiving, by the processor, a pressure parameter of the accumulator, calculating, by the processor, a difference between the pressure parameter and a threshold pressure and, controlling, by the processor, the pneumatic pump and at least one of the first valve or the second valve in response to the difference between the pressure parameter and the threshold pressure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
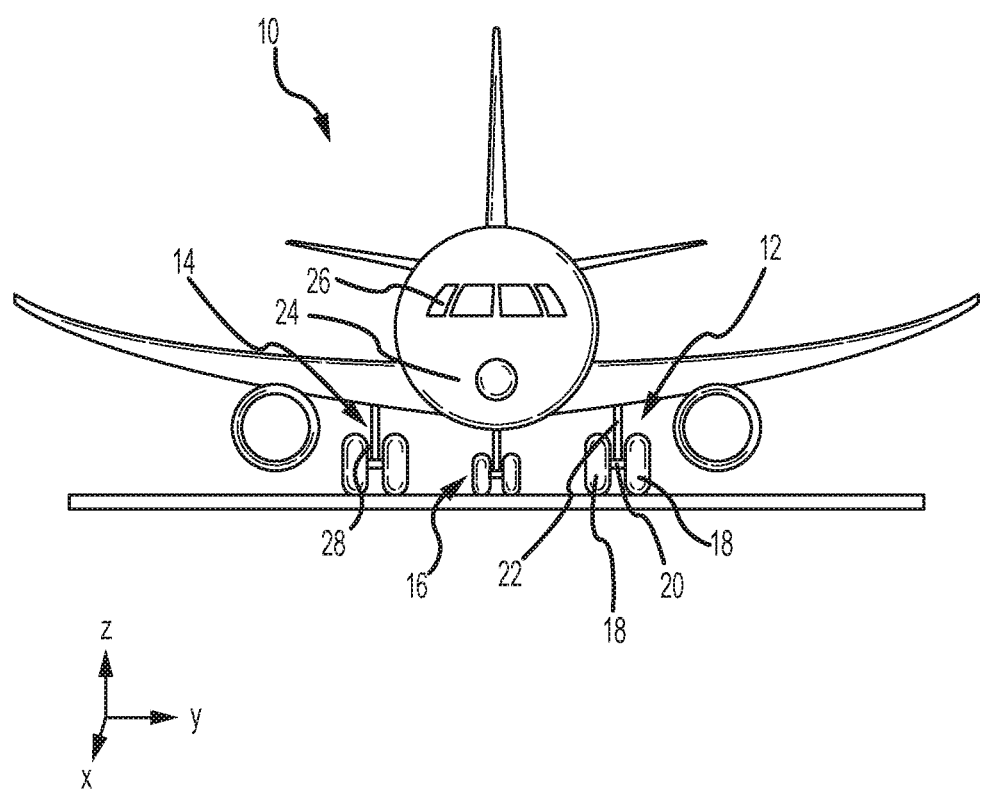
FIG. 1 illustrates an aircraft, in accordance with various embodiments.

With reference to FIG. 1, an aircraft 10 in accordance with various embodiments may comprise aircraft systems, for example, one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut 22 comprising a strut shrink system. An XYZ axes is used throughout the drawings to illustrate the axial (y), forward (x) and vertical (z) directions relative to shock strut 22. In various embodiments, shock strut 22 may comprise a stroke length defined by a limit of the travel (generally along the z-axis) of the strut piston within the strut cylinder. In various embodiments, in response to a load such as, for example, a landing load, the shock strut 22 may be compressed and the strut piston may travel over a portion of the stroke length tending thereby to attenuate the load.

Aircraft 10 may comprise controller 24, cockpit controls 26, and sensors 28. In various embodiments, landing gear 14, landing gear 16, and landing gear 12 may be in communication with controller 24 and may receive commands (e.g. a retract command) from controller 24, for example, to extend or retract. In various embodiments, controller 24 may be in electronic communication with cockpit controls 26 or may be in electronic communication with sensors 28 such as, for example, a weight-on-wheels (WOW) sensor and may issue commands in response to cockpit controls 26 or data and/or other feedback from sensors 28. The sensors 28 may provide aircraft speed, wheel speed, brake temperature, hydraulic pressure, air pressure, acceleration, and/or any other suitable input data. The controller 24 may receive signals or commands from a pilot or from any other suitable onboard sensors known to those skilled in the art. In various embodiments, the controller may be located in the fuselage of the aircraft and may coordinate various inputs in order to issue commands to the landing gear.

Figure 2A:
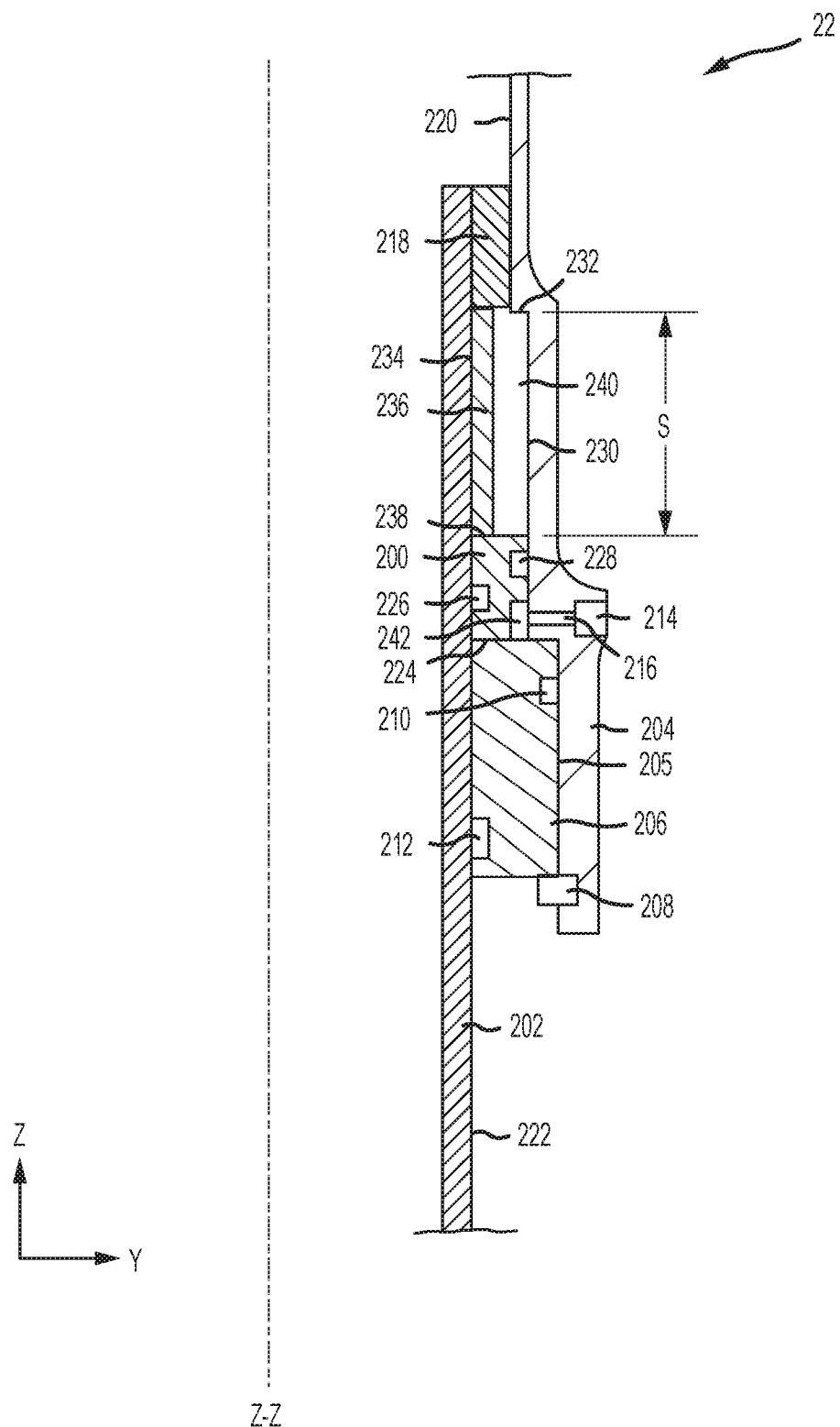
FIG. 2A illustrates a section of a shock strut in the unshrunk condition, in accordance with various embodiments

In various embodiments and with additional reference to FIG. 2A, a section of shock strut 22 comprising a shrink piston 200 is shown through the z-y plane along axis Z-Z in the extended condition. Shock strut 22 comprises a strut cylinder 204 and a strut piston 202 having an upper bearing 218 which rides along the inner surface 220 comprising a first diameter of strut cylinder 204. Strut piston 202 is retained within strut cylinder 204 by lower bearing 206 which is coupled at a distal end of strut cylinder 204 proximate lower bearing block 208. Lower bearing 206 comprises an upper seal 210 at an inner surface 205 of strut cylinder 204 and a lower seal 212 which rides along the outer surface 222 of strut piston 202 and retain shock strut fluid within the interior of strut piston 202 and strut cylinder 204. A shrink piston 200 rests above (in the positive direction on the z-axis) lower bearing 206 on a top surface 224 of lower bearing 206 and comprises an inner seal 226 which rides on outer surface 222 of strut piston 202. Shrink piston 200 further comprises an outer seal 228 which rides on inner surface 230 comprising a second diameter of strut cylinder 204 defined by step 232. A rebound chamber volume 234 is defined radially outward of outer surface 222 of strut piston 202 and radially inward of the second diameter of inner surface 230 of strut cylinder 204 along the z-axis between top surface 224 of lower bearing 206 and step 232.

In various embodiments, a spacer 236 may be disposed within the bore of rebound chamber volume 234 relatively above (in the positive direction on the z-axis) and in contact with a top surface 238 of shrink piston 200 and relatively below (in the negative direction on the z-axis) and in contact with upper bearing 218. In various embodiments, spacer 236 may comprise perforations and be coupled about a portion of strut piston 202 comprising perforations such that volume 240 of rebound chamber volume 234, defined radially outward of spacer 236 and radially inward of the second diameter and between step 232 and top surface 238 of shrink piston 200, is in fluid communication with the interior of strut piston 202 and strut cylinder 204 and filled with shock strut fluid. In various embodiments, a spacer such as spacer 236 may be integral to one of a shrink piston, an upper bearing, or a strut piston. In various embodiments, inner seal 226 and outer seal 228 fluidly isolate volume 240 from chamber 242 at the base of shrink piston 200 above top surface 224 of lower bearing 206. In various embodiments, chamber 242 is in fluid communication with shrink port 214 via passage 216 through strut cylinder 204. In various embodiments, hydraulic fluid may flow into chamber 242 through shrink port 214 by hydraulic pressure and, in response, shrink piston 200 may be driven relatively upward (along the positive z-axis) within rebound chamber volume 234. In various embodiments, shrink piston 200 tends to displace shock strut fluid within volume 240 in response to a hydraulic fluid filling chamber 242. In various embodiments, shrink piston 200 may act on upper bearing 218 via spacer 236 causing upper bearing 218 to slide along inner surface 220 tending to drive strut piston 202 relatively upward into strut cylinder 204 in response to the upward motion of shrink piston 200 tending thereby to shrink shock strut 22 along axis Z-Z by a shrink stroke S of shrink piston 200 within rebound chamber volume 234 defined between step 232 and top surface 238.

Figure 2B:
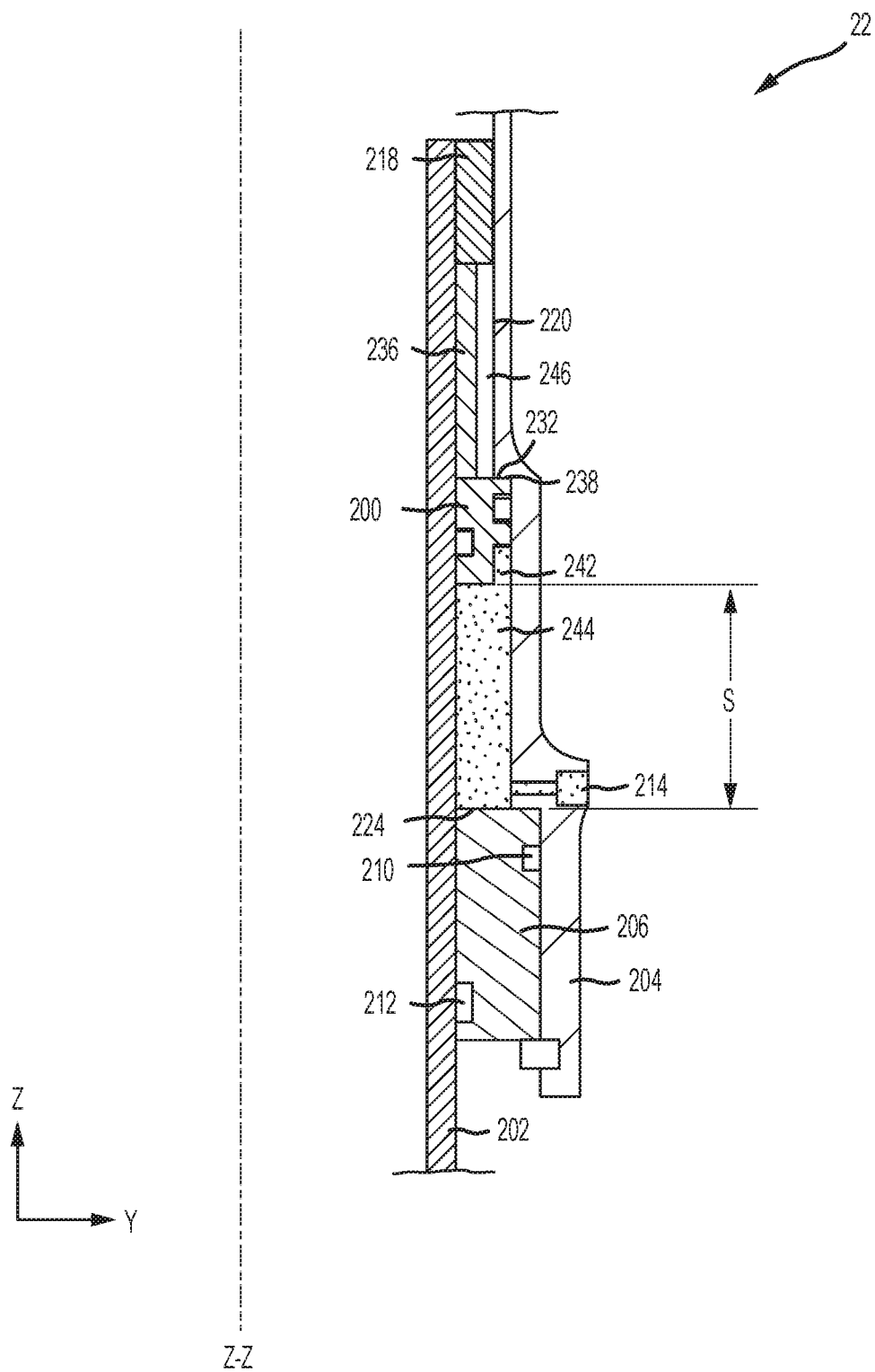
FIG. 2B illustrates a section of a shock strut in the shrunk condition.

In various embodiments and with additional reference to FIG. 2B, a section of shock strut 22 comprising a shrink piston 200 is shown through the z-y plane along axis Z-Z in the shrunk condition. Hydraulic fluid 244 under pressure has entered shrink port 214 and filled chamber 242 at the base of shrink piston 200 and the space above top surface 224 of lower bearing 206. In response to hydraulic fluid 244 under pressure filling chamber 242, shrink piston 200 has traversed shrink stroke S and been driven into contact with step 232 at top surface 238, thereby displacing the shock strut fluid within volume 240. In response to the upward motion of shrink piston 200, upper bearing 218 is displaced by spacer 236 upward along inner surface 220 and strut piston 202 is driven upward along axis Z-Z into strut cylinder 204 tending to open volume 246 defined radially outward of spacer 236 and radially inward of the first diameter of inner surface 220 between upper bearing 218 and top surface 238 of shrink piston 200.

Figure 3A:
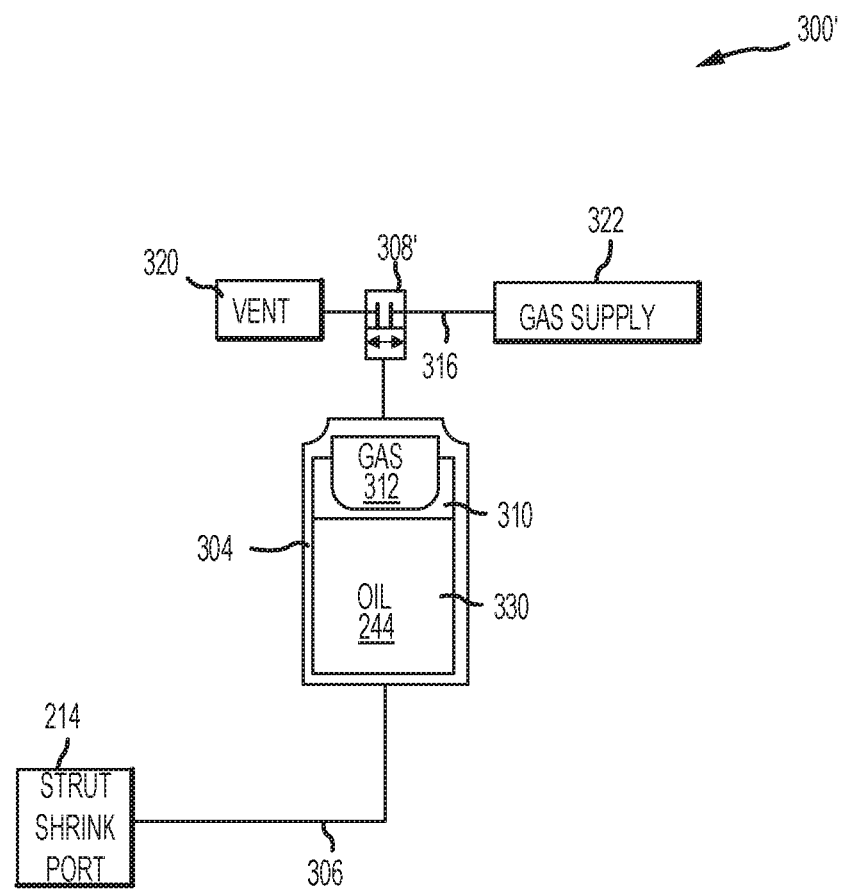
FIG. 3A illustrates a system for controlling shock strut shrink.

In various embodiments and with additional reference to FIG. 3A, a system for enabling shock strut shrink 300' is provided. In various embodiments, system for enabling shock strut shrink 300' may comprise a first valve 308' and an accumulator 304 comprising a gas piston 310 and a hydraulic chamber 330. Hydraulic chamber 330 may be in fluid communication with a shock strut comprising a shrink piston, such as shock strut 22 comprising shrink piston 200. In various embodiments, hydraulic fluid 244 may be contained within hydraulic chamber 330 and may flow through hydraulic lines 306 and through shrink port 214 in response to gas pressure within pneumatic cylinder 312 applied by gas piston 310 to hydraulic chamber 330. In various embodiments, first valve 308' may be in fluid communication with gas supply 322, vent 320, and pneumatic cylinder 312. In various embodiments, first valve 308' may admit gas under pressure into pneumatic cylinder 312 and may release gas under pressure from pneumatic cylinder 312 at vent 320. In this regard, first valve 308' may control the pressure applied by gas piston 310 to hydraulic fluid 244 and thereby enable a shock strut, such as shock strut 22, to shrink i.e. transition from an unshrunk state (referring to FIG. 2A) to a shrunk state (referring to FIG. 2B) by admitting gas under pressure into pneumatic cylinder 312 tending thereby to pressurize accumulator 304 and, in response, overcome an internal spring force of the shock strut. In various embodiments, the first valve 308' may enable a shock strut, such as shock strut 22, to unshrink i.e. transition from the shrunk state to the unshrunk state by releasing the gas under pressure from pneumatic cylinder 312 tending thereby to allow the shock strut to rebound in response to the internal spring force of the shock strut.

In various embodiments, one or more valves such as, for example, a second valve or a third valve may be used at various points to control the flow of hydraulic fluid 244 or of gas between components of a system for enabling shock strut shrink. In various embodiments, a valve such as first valve 308' may comprise at least one of a solenoid valve or a three way valve. In various embodiments, a second valve or a third valve may be in fluid communication with a vent such as vent 320 and a pneumatic cylinder such as pneumatic cylinder 312. In various embodiments, a gas from a gas supply such as gas supply 322 may comprise one of air or an inert gas mixture such as, for example, nitrogen or a gas supplied by an inerting system.

Figure 3B:
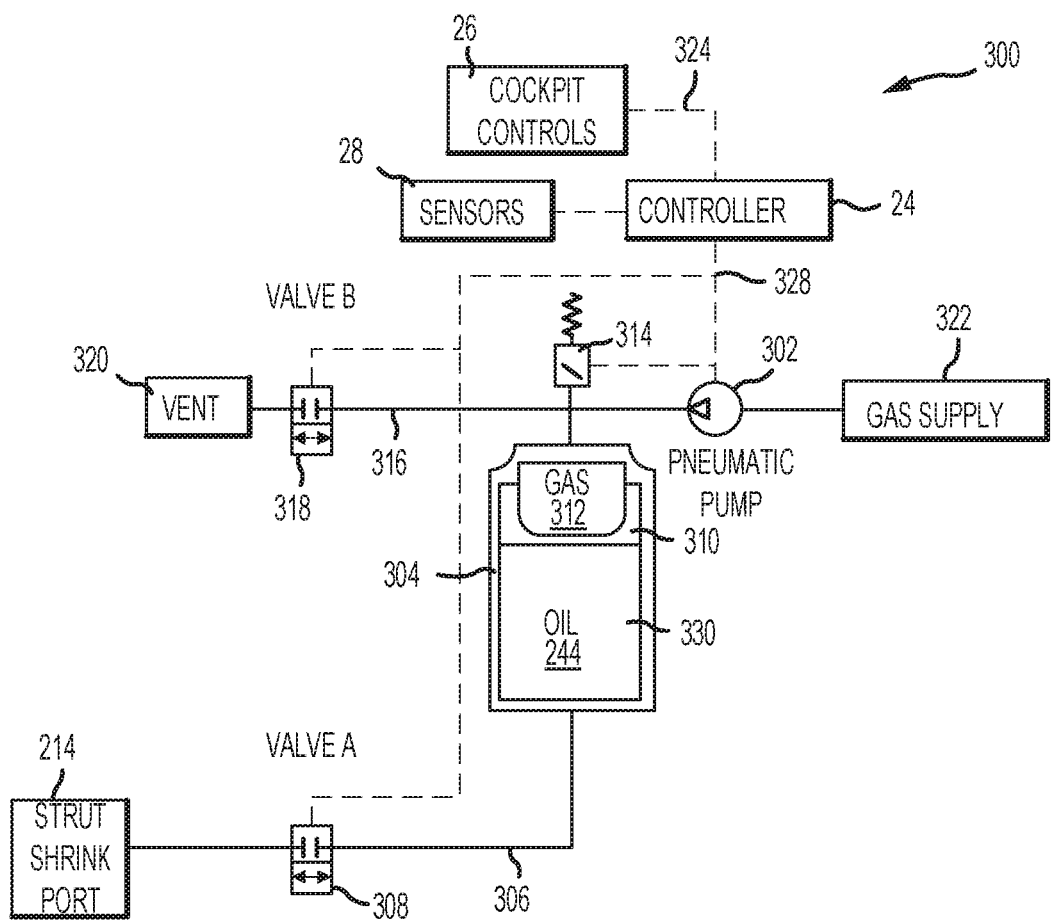
FIG. 3B illustrates a system for controlling shock strut shrink.

In various embodiments and with additional reference to FIG. 3B, a system 300 may comprise pneumatic pump 302, vent 320, valve B 318, accumulator 304, and valve A 308. In various embodiments, valve A 308, shrink port 214 and accumulator 304 are in fluid communication via hydraulic lines 306. In various embodiments, vent 320, valve B 318, accumulator 304, pneumatic pump 302, and gas supply 322 are in fluid communication via pneumatic lines 316. In various embodiments, system for enabling shock strut shrink 300 may comprise one or more feedback elements to monitor and measure system characteristics. For example, sensors 28 may be coupled to or in direct electronic communication with pneumatic pump 302, accumulator 304, valve A 308, valve B 318, pressure switch 314, landing gear 12, landing gear 14, and landing gear 16. Sensors 28 may comprise a temperature sensor, a torque sensor, a speed sensor, a pressure sensor, a position sensor, a displacement sensor, an accelerometer, a voltmeter, an ammeter, a wattmeter, or any other suitable measuring device known to those skilled in the art. Sensors 28 may be configured to measure a characteristic of an aircraft system or component. Sensors 28 may be configured to measure, for example, a weight-on-wheels condition, an oleo strut pressure, a shrink piston pressure, a shock strut position, a landing gear position, a valve position, a pump speed, or an accumulator pressure. Sensors 28 may be configured to transmit the measurements to controller 24, thereby providing sensor feedback about the aircraft system to controller 24. The sensor feedback may be, for example position feedback, temperature feedback, pressure feedback or other data.

In various embodiments, controller 24 may be in electronic communication with a pilot through a control interface of cockpit controls 26, for example, a landing gear lever that the pilot can operate which may output a command signal 324. In various embodiments, the output command signal 324 may comprise instructions to command 'landing gear extend' or 'landing gear retract.' In various embodiments, controller 24 may be integrated into computer systems onboard an aircraft. In various embodiments, controller 24 may comprise a processor. In various embodiments, controller 24 may be implemented in a single processor. In various embodiments, controller 24 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, with continued reference to FIGS. 1 through 3B, valve A 308 and valve B 318 may comprise a solenoid valve having a return to close spring. In various embodiments, valve A 308, valve B 318, and pneumatic pump 302 may be in electronic communication with and may be configured to receive electronic data from or be controlled via controller 24. In various embodiments, controller 24 may be configured to control valve A 308, valve B 318, and pneumatic pump 302 by control signals 328 issued in response to command signals 324 or sensor data from sensors 28. In various embodiments, in response to command signals 324 and/or input from sensors 28, controller 24 may cause a shock strut, such as shock strut 22, to transition from an unshrunk state (referring to FIG. 2A) to a shrunk state (referring to FIG. 2B) or may cause a shock strut to transition from a shrunk state to an unshrunk state.

In various embodiments, in response to a pressure parameter of accumulator 304, controller 24 may command valve A 308 and valve B 318 to close and command pneumatic pump 302 to pump gas from gas supply 322 into accumulator 304 tending to pressurize pneumatic cylinder 312 and apply pressure to hydraulic fluid 244 contained within hydraulic chamber 330 via gas piston 310. In various embodiments, pneumatic cylinder 312 may have an operating pressure of between 1,000 psi [6,895 kPa] and 3,500 psi [24,132 kPa], or between 1,500 psi [10,342 kPa] and 3,000 psi [20,684 kPa], or between 2,000 psi [13,790 kPa] and 2,500 psi [17,237 kPa]. In various embodiments, in response to at least one of a command signal 324 or a WOW parameter, controller 24 may command valve B 318 to close and valve A 308 to open or may command valve A to open and valve B to open. In various embodiments, in response to at least one of a command signal or a position feedback of a shock strut position, controller 24 may command valve A 308 to open or close. In various embodiments, in response to at least one of a command signal or a position feedback of a landing gear position, controller 24 may command valve B 318 to open or to close and activate or deactivate pneumatic pump 302.

Figure 4A:
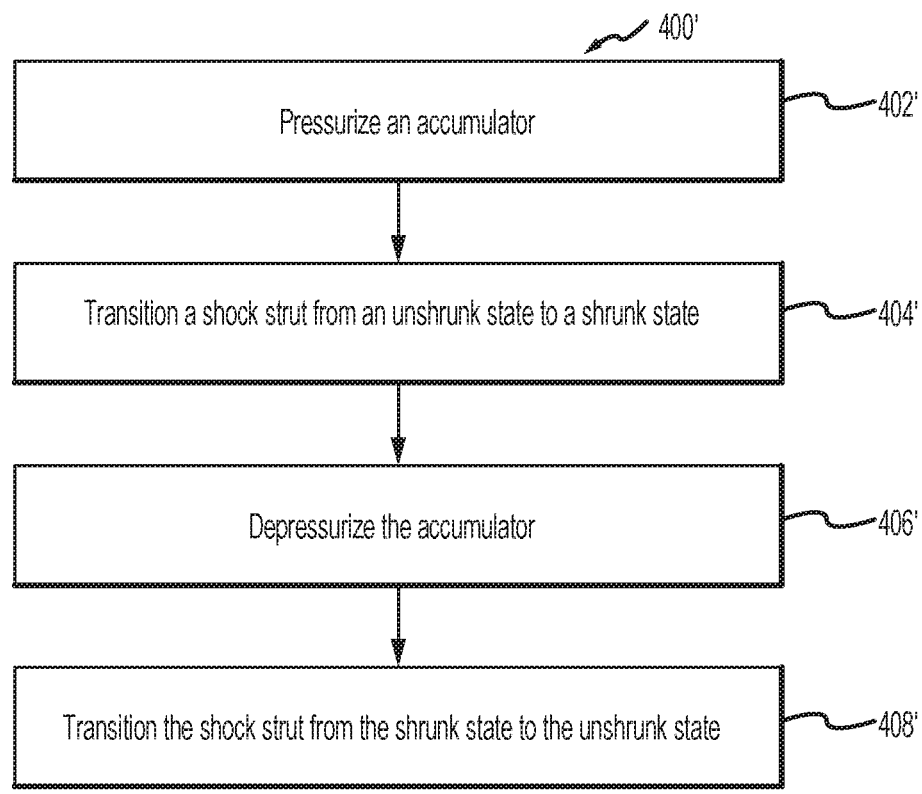
FIG. 4A illustrates a process flow for a method for shrinking a shock strut.

In various embodiments and with reference to FIG. 4A, a method 400' for shrinking a shock strut comprises steps including pressurizing an accumulator (Step 402'). In various embodiments, step 402' may comprise actuating first valve 308' and, in response, receiving by accumulator 304 a gas under pressure from gas supply 322 into pneumatic cylinder 312. In various embodiments, actuating first valve 308' tends to allow gas under pressure to flow through pneumatic lines 316 into pneumatic cylinder 312 of accumulator 304. In various embodiments, method 400' may include transitioning a shock strut from an unshrunk state to a shrunk state (step 404') in response to the pressurizing the accumulator. In various embodiments, step 404' may comprise shock strut 22 transitioning from an unshrunk state to a shrunk state in response to accumulator 304 sending hydraulic fluid 244 from hydraulic chamber 330, driven under pressure by gas piston 310, through hydraulic lines 306 to shrink port 214. In various embodiments, method 400' may include depressurizing the accumulator (step 406'). In various embodiments, step 406' may comprise actuating first valve 308' and, in response, sending gas from pneumatic cylinder 312 of accumulator 304 to flow through pneumatic lines 136 to vent 320 tending thereby to reduce the pressure exerted on hydraulic fluid 244 by gas piston 310. In various embodiments, method 400' may include transitioning the shock strut from the shrunk state to the unshrunk state (step 408') in response to the depressurizing the accumulator. In various embodiments, step 408' may comprise receiving, by accumulator 304, hydraulic fluid 244 under pressure from shrink port 214 into hydraulic chamber 330 and, in response, shock strut 22 transitioning from the shrunk state to the unshrunk state.

Figure 4B:
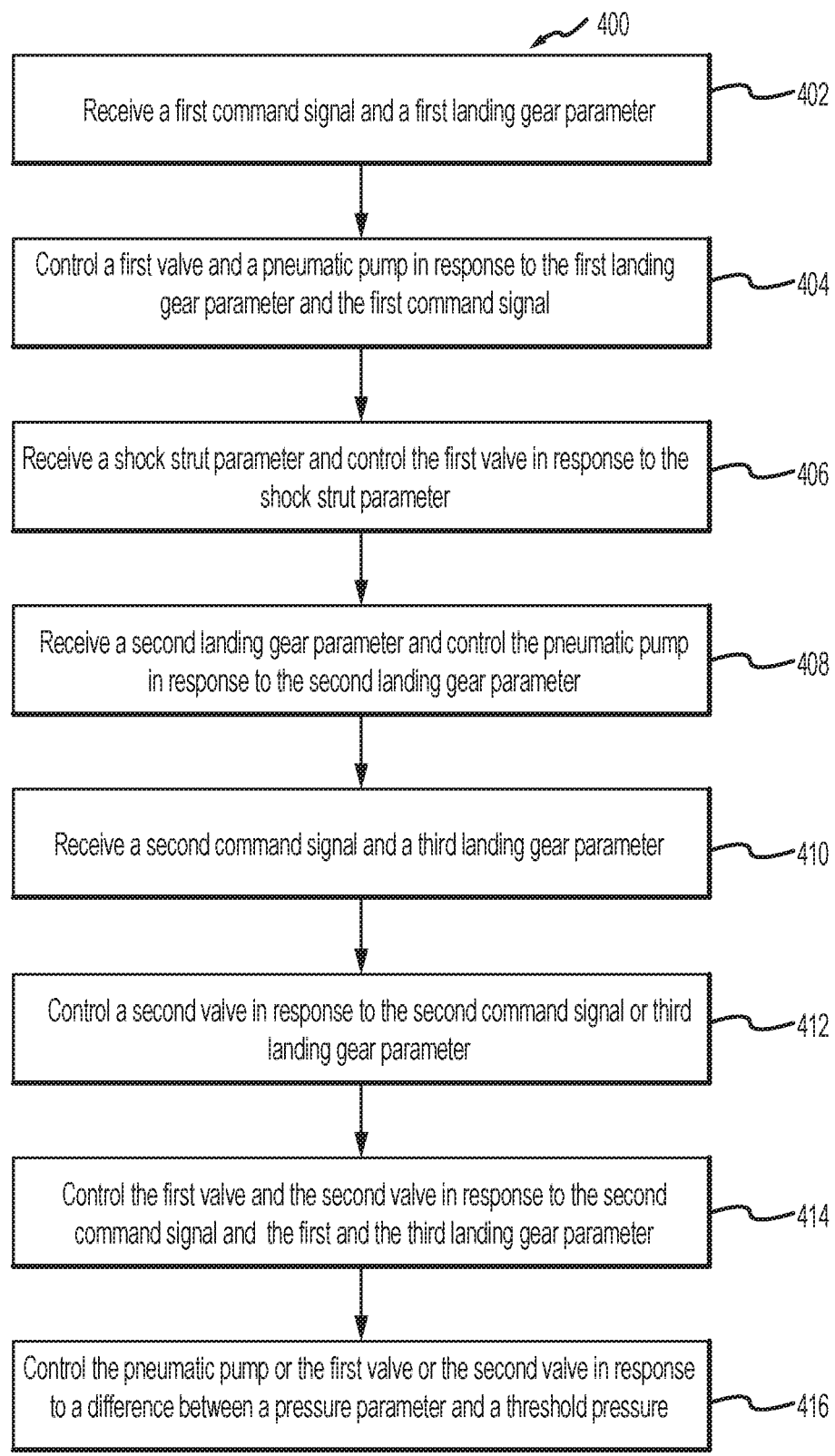
FIG. 4B illustrates a process flow for a method of controlling shock strut shrink, in accordance with various embodiments.

With reference to FIG. 4B, a method 400 for shrinking a shock strut is illustrated in accordance with various embodiments. Method 400 includes receiving, by a controller, a first command signal and a first landing gear parameter (Step 402). Method 400 includes controlling, by the controller, a first valve and a pneumatic pump in response to the first landing gear parameter and the first command signal (Step 404). Method 400 includes receiving, by the controller, a shock strut parameter and controlling, by the controller, the first valve in response to the shock strut parameter (Step 406). Method 400 includes receiving, by the controller, a second landing gear parameter and controlling, by the controller, the pneumatic pump in response to the second landing gear parameter (Step 408). Method 400 includes receiving, by the controller, a second command signal and a third landing gear parameter (Step 410). Method 400 includes controlling, by the controller, a second valve in response to at least one of the second command signal or the third landing gear parameter (Step 412). Method 400 includes controlling, by the controller, the first valve and the second valve in response to the second command signal, the first landing gear parameter, and the third landing gear parameter (Step 414). Method 400 includes receiving, by the controller, a pressure parameter, calculating, by the controller, a difference between the pressure parameter and a threshold pressure and, controlling, by the controller, at least one of the pneumatic pump, the first valve, or the second valve, in response to the difference between the pressure parameter and the threshold pressure and at least one of the first command signal, the second command signal, or the first landing gear parameter (Step 416).

With reference FIGS. 1 through 4, step 402 may include receiving, by controller 24, command signals 324 comprising a first command signal such as, for example, a 'landing gear retract' signal, and a first landing gear parameter from sensors 28, such as a WOW condition, of a landing gear such as landing gear 12. Step 404 may include controller 24, in response to the first command signal and the first landing gear parameter, commanding pneumatic pump 302 to pump gas, such as, for example, air from gas supply 322 into accumulator 304 tending to pressurize pneumatic cylinder 312 and apply pressure to hydraulic fluid 244 within hydraulic chamber 330 via gas piston 310. Step 404 may further include commanding valve A 308 to open causing hydraulic fluid 244 to flow from accumulator 304 through hydraulic lines 306 in fluid communication with shrink port 214 and, in response, hydraulic fluid 244 flows into chamber 242 through shrink port 214 causing shrink piston 200 to be driven relatively upward (along the z-axis) within rebound chamber volume 234 into volume 240 by hydraulic pressure, tending thereby to transition shock strut 22 from an unshrunk to a shrunk state. Step 406 may include controller 24 receiving a shock strut parameter from sensors 28, such as, for example, a position feedback of a shrink stroke S of shock strut 22 indicating shock strut 22 is fully shrunk, and, in response, commanding valve A 308 to close thereby forming a hydraulic block tending to inhibit shock strut 22 from transitioning to an unshrunk state. Step 408 may including controller 24 receiving a second landing gear parameter from sensors 28, such as an up and locked condition of landing gear 12, and commanding pneumatic pump 302 to stop pumping gas in response to the second landing gear parameter. Step 410 may include controller 24 receiving a command signals 324 comprising a second command signal such as, for example, a 'landing gear extend' signal, and a third landing gear parameter from sensors 28, such as a down and locked condition of landing gear 12. Step 412 may include controller 24 commanding valve B 318 to open in response to at least one of the second command signal or the third landing gear parameter. In response to valve B 318 opening, gas in pneumatic cylinder 312 may flow through pneumatic lines 316 and escape at vent 320 tending thereby to depressurize pneumatic cylinder 312 and, in response, tending to reduce the pressure of the hydraulic fluid 244 of accumulator 304. Step 414 may include controller 24, in response to the second command signal, the first landing gear parameter, and the third landing gear parameter, commanding valve B 318 to open and commanding valve A 308 to open thereby removing the hydraulic block and causing hydraulic fluid 244 to flow from chamber 242 through shrink port 214 through hydraulic lines 306 into accumulator 304 causing shrink piston 200 to be driven relatively downward (along the z-axis) within rebound chamber volume 234 in response to shock strut fluid pressure, tending thereby to transition shock strut 22 from a shrunk state to an unshrunk state. Step 416 may include controller 24 receiving a pressure parameter from sensors 28, such as, for example, a pneumatic pressure of pneumatic cylinder 312, calculating a difference between the pressure parameter and a threshold pressure, such as, for example, a pneumatic cylinder operating pressure, and, in response to the difference, commanding pneumatic pump 302 to pump gas and commanding at least one of valve B 318 to close or valve A 308 to close.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for enabling shock strut shrink, comprising:
   a shock strut comprising a shrink piston;
   an accumulator comprising a gas piston, a pneumatic cylinder, and a hydraulic chamber in fluid communication with the shrink piston, wherein the gas piston is configured to apply gas pressure to the hydraulic chamber;
   a first valve in fluid communication with the accumulator;
   a second valve, wherein the second valve is in fluid communication with a vent, the pneumatic cylinder, and the gas piston, wherein the first valve is in fluid communication with the hydraulic chamber and the shrink piston;
   a gas supply in fluid communication with the second valve;
   a pneumatic pump in fluid communication with the second valve;
   a first sensor in electronic communication with a controller, the first sensor configured to measure at least one of a first landing gear parameter, a second landing gear parameter, a third landing gear parameter, or a shock strut parameter;
   a second sensor in electronic communication with the controller and configured to measure a pressure parameter of the accumulator; and
   a tangible, non-transitory memory configured to communicate with the controller, the tangible, non-transitory memory having instructions stored thereon that, in response to execution by the controller, cause the controller to perform operations comprising:
   receiving, by the controller, a first command signal and the first landing gear parameter;
   controlling, by the controller, the pneumatic pump and the first valve in response to the first command signal and the first landing gear parameter;
   receiving, by the controller, the pressure parameter of the accumulator;
   calculating, by the controller, a difference between the pressure parameter and a threshold pressure; and
   controlling, by the controller, the pneumatic pump and at least one of the first valve or the second valve in response to the difference between the pressure parameter and the threshold pressure.

2. The system of claim 1, wherein the operations further comprise receiving, by the controller, the shock strut parameter and controlling, by the controller, the first valve in response to the shock strut parameter; and
   receiving, by the controller, the second landing gear parameter and controlling, by the controller, the pneumatic pump in response to the second landing gear parameter.

3. The system of claim 2, wherein the operations further comprise receiving, by the controller, a second command signal and a third landing gear parameter and controlling, by the controller, the second valve, in response to at least one of the second command signal or the third landing gear parameter.

4. The system of claim 3, wherein the operations further comprise controlling, by the controller, the first valve and the second valve in response to the third landing gear parameter and the first landing gear parameter.

5. The system of claim 1, wherein the threshold pressure is an operating pressure of the pneumatic cylinder.

6. The system of claim 4, wherein the first landing gear parameter comprises a weight-on-wheels condition, wherein the second landing gear parameter comprises an up and locked condition of the landing gear, wherein the third landing gear parameter comprises a down and locked condition of the landing gear, wherein the shock strut transitions from an unshrunk state to a shrunk state in response to the controlling, by the controller, of the first valve, and wherein the shock strut transitions from the shrunk state to the unshrunk state in response to the controlling, by the controller, of the first valve and the second valve.

7. A method for shrinking a shock strut, comprising:
   pressurizing an accumulator comprising a pneumatic cylinder, a gas piston, and a hydraulic chamber in fluid communication with a shrink piston of a shock strut;
   transitioning the shock strut from an unshrunk state to a shrunk state in response to the pressurizing the accumulator;
   depressurizing the accumulator; and
   transitioning the shock strut from the shrunk state to the unshrunk state in response to the depressurizing the accumulator,
   wherein the pressurizing the accumulator further comprises actuating a valve in fluid communication with the accumulator and a gas supply and receiving, by the accumulator, a gas under pressure from the gas supply into the pneumatic cylinder,
   wherein the transitioning the shock strut from the unshrunk state to the shrunk state further comprises sending, by the accumulator, a hydraulic fluid under pressure from the gas piston to a shrink port of the shock strut, and
   wherein the depressurizing the accumulator further comprises actuating the valve and sending, by the accumulator, the gas under pressure to a vent, and wherein the transitioning the shock strut from the shrunk state to the unshrunk state further comprises receiving, by the accumulator, the hydraulic fluid under pressure from shrink port into the hydraulic chamber.

8. The method of claim 7, further comprising:
   receiving, by a controller, a first command signal and a first landing gear parameter, wherein the first landing gear parameter is received from a first sensor;
   controlling, by the controller, a pneumatic pump and a first valve in response to the first command signal and the first landing gear parameter;

receiving, by the controller and from a second sensor, a pressure parameter of the accumulator;

calculating, by the controller, a difference between the pressure parameter and a threshold pressure; and controlling, by the controller, the pneumatic pump and at least one of the first valve or a second valve in response to the difference between the pressure parameter and the threshold pressure, wherein the second valve is in fluid communication with the vent, the pneumatic cylinder, and the gas piston, wherein the first valve is in fluid communication with the hydraulic chamber and the shrink piston.

9. The method of claim 8, further comprising:

receiving, by the controller, a shock strut parameter;

receiving, by the controller, the second landing gear parameter;

controlling, by the controller, the first valve in response to the shock strut parameter;

controlling, by the controller, the pneumatic pump in response to the second landing gear parameter;

receiving, by the controller, a second command signal and a third landing gear parameter; and controlling, by the controller, the second valve, in response to at least one of the second command signal or the third landing gear parameter.

10. The method of claim 9, further comprising controlling, by the controller, the first valve and the second valve in response to the third landing gear parameter and the first landing gear parameter.

11. An article of manufacture including a tangible, non-transitory computer-readable storage medium having instructions stored thereon that, in response to execution by a processor, cause the processor to perform operations comprising:

receiving, by the processor, a first command signal and receiving, by the processor, a first landing gear parameter from a sensor in electronic communication with the processor wherein the first landing gear parameter comprises measured characteristics of a landing gear comprising a shock strut comprising a shrink piston;

controlling, by the processor, a pneumatic pump in fluid communication with an accumulator comprising a pneumatic cylinder, a gas piston, and a hydraulic chamber, in response to the first command signal and the first landing gear parameter;

controlling, by the processor, a first valve in fluid communication with the hydraulic chamber and a shrink port of the shrink piston, wherein the gas piston is configured to apply gas pressure to the hydraulic chamber receiving, by the processor, a pressure parameter of the accumulator from a second sensor in electronic communication with the processor and configured to measure the pressure parameter of the accumulator;

calculating, by the processor, a difference between the pressure parameter and a threshold pressure; and controlling, by the processor, the pneumatic pump and at least one of the first valve or a second valve in response to the difference between the pressure parameter and the threshold pressure, wherein the second valve is in fluid communication with a vent and the pneumatic cylinder of the accumulator.

12. The article of manufacture of claim 11, further comprising an operation of receiving, by the processor, a shock strut parameter of the shock strut and controlling, by the processor, the first valve in response to the shock strut parameter, and receiving, by the processor, a second landing gear parameter of the landing gear and controlling, by the processor, the pneumatic pump in response to the second landing gear parameter.

13. The article of manufacture of claim 12, further comprising an operation of receiving, by the processor, a second command signal and a third landing gear parameter of the landing gear and controlling, by the processor, the second valve in response to at least one of the second command signal or the third landing gear parameter, and controlling, by the processor, the first valve and the second valve in response to the third landing gear parameter and the first landing gear parameter.

* * * * *